May 30, 1961
T. F. SARAH
2,986,355
ANTI-BACKLASH DEVICE
Filed Nov. 6, 1959
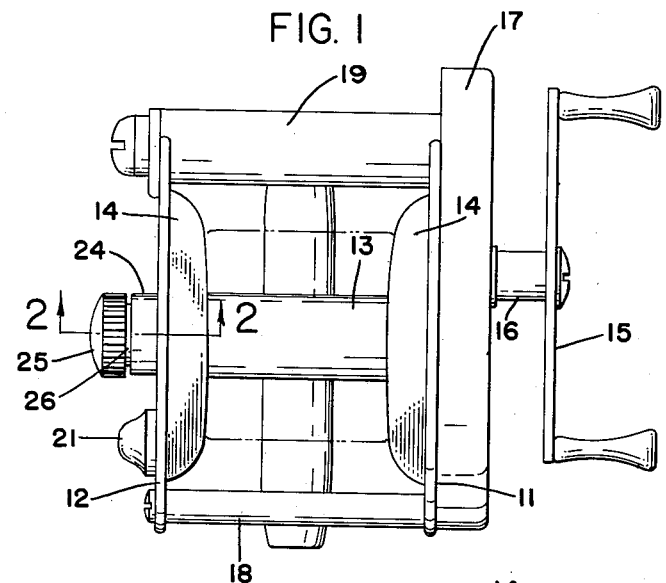
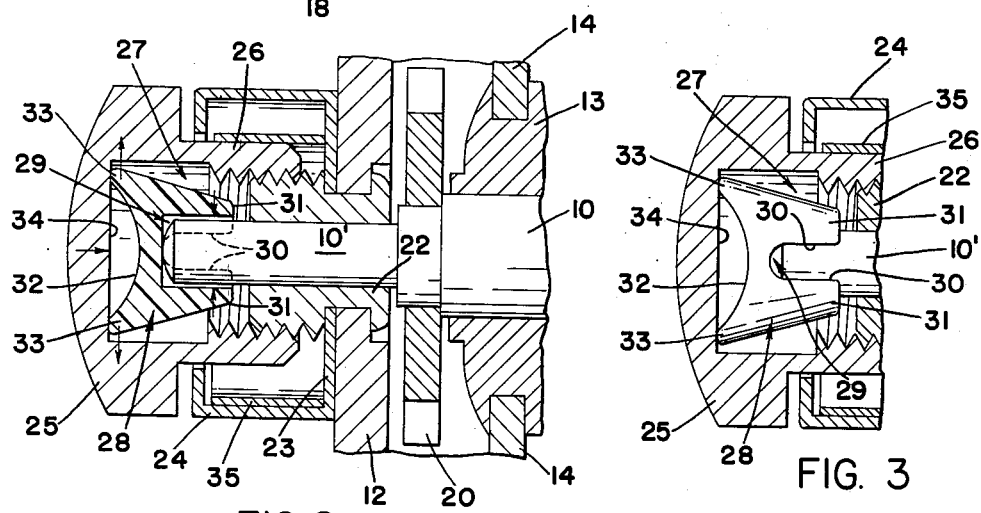
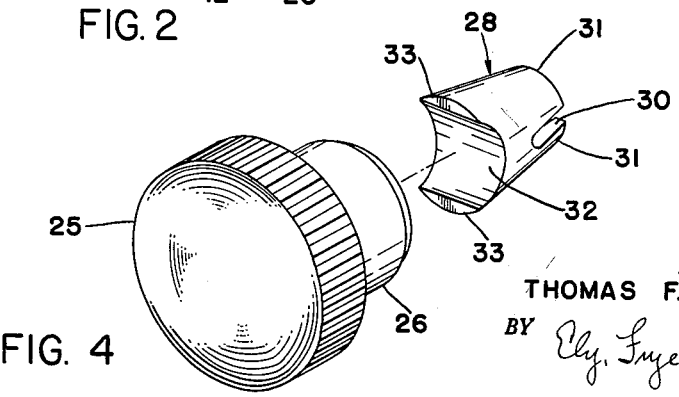
INVENTOR.
THOMAS F. SARAH
BY Ely, Frye & Hamilton
ATTORNEYS United States Patent Office 2,986,355
Patented May 30, 1961

2,986,355
ANTI-BACKLASH DEVICE
Thomas F. Sarah, Akron, Ohio, assignor to The Enterprise Manufacturing Company, Akron, Ohio, a corporation of Ohio
Filed Nov. 6, 1959, Ser. No. 851,337
2 Claims. (Cl. 242—84.5)

The invention relates to fishing reels, and more particularly to a friction brake mechanism acting on the line spool of a reel to prevent backlash during casting.

Backlash occurs during casting because the momentum of the spool causes it to revolve faster than the line unwinds or pays out, with the result that the outer turns of the line are thrown outward radially and become overlapped and tangled, causing the lure on the line to stop with a jerk. This not only spoils the cast but creates the difficult task of untangling the line before the line can be retrieved preparatory to making another cast.

Experienced fishermen guard against backlash by applying the thumb of the casting hand against the line on the spool with a light pressure to act as a frictional brake and synchronize the speed of the spool and the unwinding of the line. However, thumbing the line properly requires skill and practice, and even the most experienced fisherman may have to contend with backlash on various occasions.

Certain prior reels have embodied braking mechanism to control backlash, but all of these of which I am aware have certain disadvantages, such as excessive cost, inadequate frictional surface, and rapid wear. In certain cases, a nut is used to force a plate into frictional contact with the end of the spool shaft, and in order to get sufficient friction the nut sometimes must be drawn up so tightly on the end plate of the reel housing as to bow the plate.

Another important disadvantage with such prior anti-backlash devices is that they are difficult to adjust accurately and sensitively to obtain the right amount of friction to control backlash; in other words, a slight turn of the adjusting nut varies the braking effect by too much or too little.

It is an object of the present invention to provide an improved anti-backlash mechanism for a fishing reel which overcomes the disadvantages of prior constructions.

More specifically, it is an object to provide an improved backlash mechanism which is inexpensive, durable, and easy to adjust for accurate and sensitive control.

These and other objects are accomplished by the improvements comprising the present invention, a preferred embodiment of which is shown by way of example in the accompanying drawing and described in detail in the present specification. Various modifications and changes in details of construction are comprehended within the scope of the subjoined claims.

The improved anti-backlash mechanism is applied directly to the end of the spool shaft of the reel, and comprises a resilient shoe of semi-rigid material such as nylon fitting over and around the end of the spool shaft, the outer end of said shoe being so constructed and arranged that axial pressure thereon will exert a radially inward gripping force on the peripheral surface of the shaft.

In the drawing:

Fig. 1 is an elevation of a conventional reel embodying the improved anti-backlash device.

Fig. 2 is an enlarged fragmentary sectional view on line 2—2 of Fig. 1.

Fig. 3 is a similar view showing the shoe in elevation.

Fig. 4 is an exploded perspective view of the shoe and the adjusting nut therefor.

The conventional reel shown in Fig. 1 has a spool shaft 10 journaled in the front and back plates 11 and 12, and the hub 13 of the spool is secured on the shaft 10 with the outer edges of the end plates 14 slidably engaging said front and back plates 11 and 12.

The crank handle 15 is mounted on a drive shaft 16 laterally offset from the spool shaft 10, and is operatively connected to said spool shaft in a usual manner by gearing within the gear case 17 on the front plate 11 of the reel. The plates 11 and 12 are connected by posts 18 and 19, the larger post 19 preferably enclosing a level wind mechanism of well-known construction.

Between the hub 13 of the spool shaft and the back plate 12, a click wheel 20 may be secured on the spool shaft, and a button 21 slidably mounted on the back plate is adapted to engage a click pawl (not shown) with the click wheel when desired.

The rear end portion 10' of the shaft is preferably reduced in diameter, and journaled in a bushing 22 in the back plate 12 and extending rearwardly of said plate. The projecting portion of the bushing 22 is exteriorly threaded and secures the end wall 23 of a cup-shaped housing 24 surrounding the bushing against the back plate 12. A cap nut 25 has an annular neck 26 extending into the housing 24 and screwed onto the bushing 22.

The end portion 10' of the shaft projects beyond the bushing 22 into a cylindrical chamber 27 in the cap nut 25, and the novel friction brake shoe 28 fits over the projecting end of shaft portion 10' and is housed in said chamber. The cap nut 25 may be used as an oil cup for supplying lubricant to the end portion 10' of the shaft where it is journaled in bushing 22, in which case an oil hole would be provided in the outer wall of the cap.

The shoe 28 is made of a substantially rigid material having some resiliency and high wear resistance. A preferred material is nylon, although other plastic materials having similar characteristics may be used. As shown, the shoe is tapered to be generally frusto-conical in shape with a socket 29 in its smaller end fitting loosely over and around the end of shaft portion 10'. Diametrically opposite notches 30 extending longitudinally of the shaft are provided through the socket wall forming opposed segmental portions 31, for a purpose to be described.

The larger end of the shoe is dished or recessed on its outer surface. Preferably, the recess 32 is arcuate and is curved in a direction substantially at right angles to a plane defined by the axes or longitudinal median lines of the notches 30, and the recess forms two end abutment projections 33 on the larger end of the shoe at and in alignment with the bases of segments 31 for abutting the outer wall 34 of the nut 25. It will be seen that when the cap nut 25 is screwed inwardly on bushing 22, the abutment of the outer wall 34 with projections 33 will flex the inner segmental portions 31 of the shoe formed by the notches 30, causing them to move radially inward and frictionally grip the shaft around diametrically opposite peripheral surfaces.

Within the cup-shaped housing 24 is a tension spring 35 to hold the cap 25 in adjusted position. The spring 35 may be a curved or coil spring, one end of which frictionally engages the neck 26 of the cap and the other end frictionally engages the side wall of the housing.

Due to the fact that the shoe grips peripheral surfaces of substantial extent rather than merely abutting the end of the shaft, and to the character of the nylon material of the shoe, effective braking of the shaft is obtained with a minimum of pressure exerted by the cap nut. Moreover, a sensitive and accurate adjustment of the amount of friction applied is easily obtainable in order to control backlash under varying conditions. The nylon shoe is durable and easily replaceable.

What is claimed is:

1. In a fishing reel having an end plate and a spool shaft journaled at one end in said end plate, friction brake means to overcome backlash of the spool during casting, said means comprising a tapered nylon shoe having a socket at its smaller end fitting loosely around and abutting the end portion of said shaft and having diametrically opposite longitudinal notches passing through the wall of said socket forming opposed segments, the larger end of said shoe being recessed crosswise of a plane defined by the median lines of said notches and forming opposed end abutment portions at the bases of and in alignment with said segments, and a cap adjustably secured on said end plate engaging said end abutment portions to flex said segments into frictional contact with peripheral surfaces of said shaft.

2. In a fishing reel having an end plate and a spool shaft journaled at one end in said end plate, a bushing secured in said end plate journaling said shaft, friction brake means to overcome the backlash of the spool during casting, said means comprising a nylon shoe having opposed arcuate segments at one end fitting loosely around the end portion of the shaft, the other end of said shoe being recessed to form opposed end abutments at the bases of said segments, and a cap adjustably secured on said bushing engaging said end abutments to flex said segments radially inward into frictional contact with peripheral surfaces of said shaft.

References Cited in the file of this patent

UNITED STATES PATENTS

| 1,450,738 | Case | Apr. 3, 1923 |
| 2,347,173 | Coxe et al. | Apr. 25, 1944 |
| 2,518,482 | Mandolf et al. | Aug. 15, 1950 |
| 2,705,113 | Bonahno | Mar. 29, 1955 |

FOREIGN PATENTS

| 731,588 | Germany | Feb. 11, 1943 |